United States Patent [19]

Dolder

[11] 4,307,546
[45] Dec. 29, 1981

[54] FIRE RETARDANT PARTITIONING FOR OPENINGS FOR PLASTIC PIPE LINES

[75] Inventor: René Dolder, Jona, Switzerland
[73] Assignee: Geberit AG, Jona, Switzerland
[21] Appl. No.: 147,898
[22] Filed: May 8, 1980
[30] Foreign Application Priority Data
  Sep. 7, 1979 [CH] Switzerland .................. 8109/79
[51] Int. Cl.³ .......................................... E04H 9/00
[52] U.S. Cl. .................................. 52/1; 52/232; 137/77
[58] Field of Search ............. 52/1, 232; 248/56; 137/75, 360, 77

[56] References Cited
U.S. PATENT DOCUMENTS

| | | | |
|---|---|---|---|
| 3,678,634 | 7/1972 | Wise et al. | 52/1 |
| 3,726,050 | 4/1973 | Wise et al. | 52/1 |
| 3,768,223 | 10/1973 | Kurz | 52/1 X |
| 4,109,423 | 8/1978 | Perrain | 52/1 |
| 4,136,707 | 1/1979 | Gaillot et al. | 52/1 X |

Primary Examiner—Price C. Faw, Jr.
Assistant Examiner—Carl D. Friedman
Attorney, Agent, or Firm—Pollock, Vande Sande & Priddy

[57] ABSTRACT

Partitioning for preventing the spread of fire or smoke through wall apertures created by the burning of plastic pipe. Pre-stressed metal squeezing elements are retained by plastic bolts which melt at about 120° C., releasing the squeezing elements and permitting them to squeeze together the heat-softened plastic pipe. An insert of foamable material may additionally be used to supplement the aperture sealing effect.

7 Claims, 3 Drawing Figures

FIRE RETARDANT PARTITIONING FOR OPENINGS FOR PLASTIC PIPE LINES

SUMMARY OF THE INVENTION

The present invention relates to fire retardant partitioning for openings for plastic pipe lines through building walls and floors.

BACKGROUND OF THE INVENTION

In buildings having pipes made of plastic there is a danger that, in case of fire in a particular room, the pipe system will quickly melt and burn, whereupon both fire and smoke can move through the resulting openings in walls and floors to adjacent rooms.

To prevent this from happening, it has been proposed, e.g., in Swiss Pat. No. 566,513, to surround the pipes at the point of passage through walls or floors with protective casings containing an insert, e.g., acqueous potassium silicate or sodium silicate, which is caused by the developing heat to foam up and to seal the passages. This type of insert has a rather large overall height and is particularly useful where the fire in a particular room is extremely hot. However, in the case of fires developing a lesser amount of heat, such as smouldering fires, it takes a certain length of time for the insert to complete its foaming action and to seal the wall or floor passage.

OBJECT OF THE INVENTION

It is therefore an object of the present invention to provide partitioning of the type described, but having a small overall height, requiring less potassium silicate or sodium silicate, and producing more rapid results.

BRIEF INTRODUCTION TO THE DRAWINGS

In order that the invention may be more clearly understood, reference will now be had to be accompanying drawings, in which several embodiments of the invention are shown for purposes of illustration, and in which FIG. 1 is a cross sectional view showing a pipe line passage through a wall, with attached partitioning;

DESCRIPTION OF PREFERRED EMBODIMENT

Figure 1:
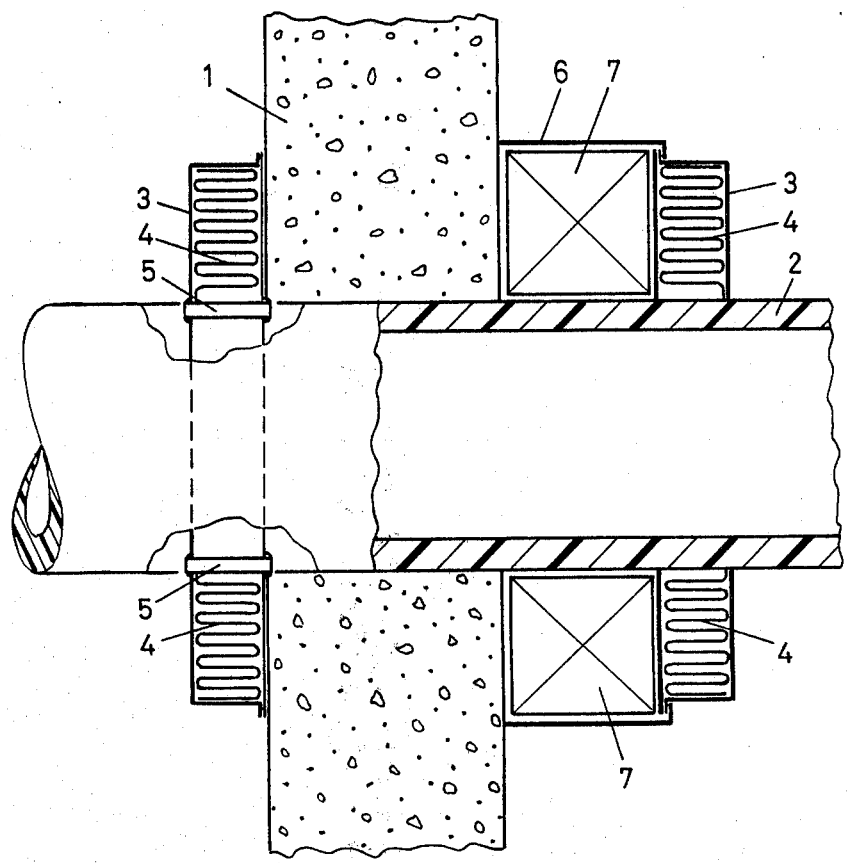

FIG. 1 shows a wall 1 through which passes a plastic pipe line 2. A partition according to the invention is attached to the left side of wall 1, and comprises a sheet metal housing 3 surrounding pipe line 2. Arranged in housing 3 at both top and bottom is a corrugated sheet metal resilient squeezing element 4, e.g., of spring steel. The two squeezing elements 4 are pre-stressed in their pressed together position, and are reatained in this position by strain bolts 5. The latter are made, e.g., of a thermoplastic plastic which, in case of fire, becomes plastic at about 120° C. and loses its rigidity. At this temperature, the strain bolts are therefore sheared off the pre-stressed squeezing elements, which thence can expand and squeeze together the plastic pipe line 2, which has meanwhile also been heated, so that the opening in wall 1 is sealed.

On the right side of wall 1, a housing 3 with two squeezing elements 4 is assembled with a second metal housing 6. The latter comprises, at each of its upper and lower portions, a rectangular insert 7 of a material known per se, which foams up at temperatures above approximately 120° C. to a multiple of its original volume. Such materials include, e.g., acqueous potassium silicate or sodium silicate. This foaming action also causes the passage in wall 1 to be sealed.

Figure 2:
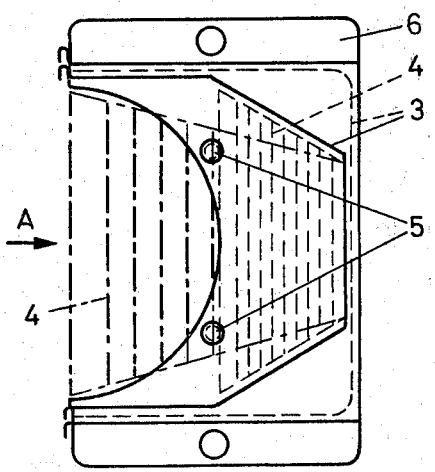
FIG. 2 is an exterior side view of two joined housing halves.
Figure 3:
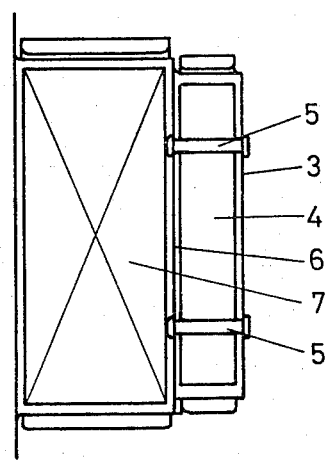
FIG. 3 is a view of the housing halves from the direction of arrow A in FIG. 2.

To permit housings 3 and 6 to be attached to passages with previously mounted pipe lines, they may be constructed in two parts. FIGS. 2 and 3 illustrate one half of two assembled housings 3 and 6. Housing part 3 is inserted into a recess of housing part 6. Squeezing element 4, which is trapezoidal in side view, is shown in housing part 3 in its pre-stressed and released state. FIG. 3 further shows the rectangular insert 7 of foamable material.

The operation is as follows:

In the case of a low-level fire, in which only pipe line 2 is ignited, squeezing elements 4 in housings 3 are particularly effective. Since strain bolts 5 are located adjacent to the pipe line, they are quickly heated and then sheared off squeezing elements 4.

In the case of a larger fire where great heat develops, inserts 7 also become operational. The spreading foam securely seals the passage in wall 1 and forms an insulating layer.

If desired, it is of course possible to install housings 6 with inserts 7 on both sides of a wall 1 or above and below a corresponding floor partition.

What is claimed is:

1. Fire retardant partitioning means for openings for a plastic pipe line through building walls and floors, comprising a housing surrounding a said pipe line, said housing having at least one resilient corrugated metal squeezing element held in a squeezed pre-stressed state by strain bolts which break at a temperature of about 120°, whereby said element is released, and during its tension release squeezes together the pipe line which has become plastic through heating.

2. Partitioning means according to claim 1, wherein said housing with said squeezing element is joined with a second housing having at least one insert of a material which foams up at temperatures above 120° to a multiple of its original volume.

3. Partitioning means according to claim 2, wherein said material is sodium silicate.

4. Partitioning means according to claim 2, wherein said material is potassium silicate.

5. Partitioning means according to claim 2, wherein said second housing comprises two parts each surrounding one-half the circumference of said pipe line and comprising a housing part with a squeezing element as well as an insert having said foamable material.

6. Partitioning means according to claim 2, wherein said housing with said squeezing element is fitted in a recess of said second housing having said insert.

7. Partitioning means according to claim 1, wherein said housing has two parts each surrounding one-half the circumference of said pipe line and comprising a said squeezing element.

* * * * *